United States Patent Office 3,810,869
Patented May 14, 1974

3,810,869
OXIDATIVELY STABILIZED POLYMER COMPOSITIONS
Edward F. Zaweski, Pleasant Ridge, Mich., assignor to Ethyl Corporation, Richmond, Va.
No Drawing. Original application Aug. 22, 1967, Ser. No. 662,277. Divided and this application May 6, 1970, Ser. No. 35,283
Int. Cl. C08f 45/58
U.S. Cl. 260—45.85 B                    7 Claims

ABSTRACT OF THE DISCLOSURE

Organic material is stabilized by small amounts of esters of [(dihydrocarbyl-4-hydroxybenzyl)thio- or oxy-] alkanoic acids. For example, polypropylene is stabilized by pentaerythritol tetrakis[2-[(3,5-di-tert-butyl-4 - hydroxybenzyl)thio]acetate]. Dialkylthio-dialkanoates and phosphites act as synergists.

This application is a division of application Ser. No. 662,277, filed Aug. 22, 1967.

BACKGROUND

Most organic material tends to degrade on aging. For example, gasoline degrades forming gums. Likewise, rubber, especially the newer synthetic rubbers such as SBR rubber, polybutadiene rubber, polychloroprene, ethylenepropylene rubber, ethylenepropylenediene terpolymer and polyisoprene, degrade resulting in loss of tensile strength and embrittlement. The problem has become especially acute in the area of organic plastics, which must endure high temperatures during fabrication of end products and still render useful service for long periods. This problem is severe in the case of poly-α-olefins such as polypropylene which contain a large number of tertiary carbon atoms which are easily oxidized. Furthermore, the recent application of these materials in the fabric area places demands on them never before encountered. They must not only be non-coloring, but must endure repeated laundering and dry-cleaning.

SUMMARY

An object of this invention is to provide a new class of antioxidant compounds. A further object is to provide organic materials normally susceptible to oxidative degradation having greatly increased stability.

These objects are accomplished by providing antioxidant compounds having the formula:

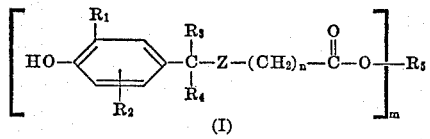

(I)

wherein $R_1$ is selected from the group consisting of alpha-branched alkyl radicals containing from 3–20 carbon atoms, alpha-branched aralkyl radicals containing from 8–20 carbon atoms and cycloalkyl radicals containing from 6–20 carbon atoms, $R_2$ is selected from the group consisting of alkyl radicals containing from 1–20 carbon atoms, aralkyl radicals containing from 7–20 carbon atoms and cycloalkyl radicals containing from 6–20 carbon atoms, Z is selected from the group consisting of sulfur and oxygen, $R_3$ and $R_4$ are independently selected from the group consisting of hydrogen and lower alkyl radicals containing from 1 to about 4 carbon atoms, $n$ is an integer from 1–6, $R_5$ is a hydrocarbon radical containing from 1 to about 20 carbon atoms and having valence $m$, and $m$ is an integer from 1–4. Examples of these compounds are:

ethyl 2-[(3-isopropyl-4-hydroxy-6-methylbenzyl)thio]acetate
lauryl 3-[(3-tert-butyl-4-hydroxy-6-methylbenzyl)oxy] propionate eicosyl 2-[(3,5-di-sec-butyl-4-hydroxybenzyl)thio]heptoate
ethyleneglycol bis[3-[3,5-di(α-methylbenzyl)-4-hydroxybenzyl]oxy]propionate]
propylidenetrimethylene tris[3-[(3-tert-octyl-4-hydroxy-5-(α,α-dimethylbenzyl)benzyl)thio]heptoate]
isopropylidenedimethylene bis[3-[(3-sec-octadecyl-4-hydroxy-6-methyl-α-methylbenzyl)oxy]propionate]
ethyleneglycol bis[2-[(3,5-di-cyclooctyl-4-hydroxybenzyl)thio]acetate]
pentaerythritol tetrakis[3-[(3,5-di(4-dodecyl cyclooctyl)-4-hydroxybenzyl)oxy]propionate]

In a more preferred embodiment, $R_3$ and $R_4$ in Formula I are hydrogen, Z is sulfur, and $R_2$ is bonded to the carbon atom of the phenolic benzene ring at the position ortho to the phenolic hydroxyl group. These compounds have the formula:

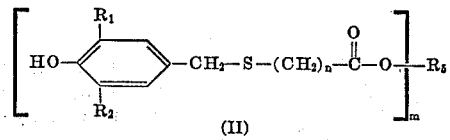

(II)

wherein $R_1$, $R_2$, $R_5$, $m$ and $n$ are the same as in Formula I. Examples of these compounds are:

hexadecyl 2-[(3,5-di-cyclohexyl-4-hydroxybenzyl)thio] acetate
lauryl 3-[(3-methyl-4-hydroxy-5-(α-methylbenzyl)-5-benzyl)thio]propionate
ethyleneglycol bis[2-[(3,5-di-tert-butyl-4-hydroxybenzyl)thio]hexoate]
propylidenetrimethylene tris[2-[(3-sec-amyl-4-hydroxy-5-ethylbenzyl)thio]acetate]

In a highly preferred embodiment, $R_1$ and $R_2$ in Formula II are tert-alkyl radicals and $n$ is 1. Examples of these compounds are:

amyl 2-[(3,5-di-tert-amyl-4-hydroxybenzyl)thio]acetate
lauryl [2-(3,5-di-tert-octyl-4-hydroxybenzyl)thio]acetate
eicosyl [2-(3,5-di-tert-octadecyl-4-hydroxybenzyl)thio] acetate
ethyleneglycol bis[2-[(3,5-di-tert-butyl-4-hydroxybenzyl)thio]acetate]
propylidenetrimethylene tris[2-[(3,5-di-tert-butyl-4-hydroxybenzyl)thio]acetate]
ethylidenetrimethylene tris[2-[(3,5-di-tert-butyl-4-hydroxybenzyl)thio]acetate]
pentaerythritol tetrakis[2-[(3,5-di-tert-butyl-4-hydroxybenzyl)thio]acetate]
ethyleneglycol bis[3-[(3,5-di(α,α-dimethyl-2,3-benzobenzyl)-4-hydroxybenzyl)thio]propionate]
n-dodecyl[2-[3,5-di(α-methyl-4-dodecylbenzyl)-4-hydroxybenzyl]thio]acetate
n-propyl 3-[benzyl-5-tert-butyl-4-hydroxybenzyl] propionate The antioxidant compounds can be prepared by various methods. One convenient method is to react the proper dihydrocarbyl-4-hydroxybenzyl chloride with an ester having a mercapto substituent on the acid portion. It is thus apparent that the new compounds are mono- and poly-esters of an alcohol represented by the mono- or polyhydroxyl-substituted $R_5$ hydrocarbon radical. Preferably, the $R_5$ alcohol is an alkane mono- or polyol represented by the formula:

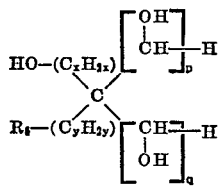

wherein $p$ and $q$ are integers from 0–1, $x$ and $y$ are integers from 0–6, $R_6$ is hydrogen or hydroxyl such that when both $x$ and $y$ are 0, $R_6$ is hydrogen. Examples of these alkane alcohols are methanol, ethanol, heptanol, glycol, glycerin, 1,2-propane-diol, 1,3-propane-diol, 1,6-hexane-diol, pentaerythritol, 1,1,1-trimethylol propane, 1,1,1-trimethylol ethane, and the like.

From the foregoing, it is apparent that $R_5$ is Formula I preferably has the formula:

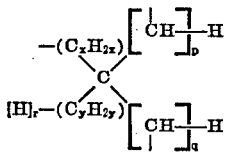

wherein $x$, $y$, $p$ and $q$ are the same as above, and $r$ is an integer from 0–1 such that when both $x$ and $y$ are 0, $r$ is 1

The following examples serve to illustrate preparation of the compounds. All parts are by weight.

EXAMPLE 1

In a reaction vessel equipped with stirrer, thermometer, addition funnel and provided with a nitrogen atmosphere was placed 25.5 parts of 3,5-di-tert-butyl-4-hydroxybenzyl chloride and 390 parts of benzene. While stirring, 10.5 parts of glycol dimercapto acetate was added. Following this, 20.2 parts of triethylamine was added over a 20 minute period, while the temperature rose slowly from 25–35° C. A white precipitate formed. The mixture was stirred for several hours and then filtered. The filtrate was washed with water followed by dilute hydrochloric acid until it was neutral. Benzene was distilled out until 31.5 parts of a viscous yellow oil remained. This oil was crystallized from ethanol, giving a white solid analyzing: C, 65.3%, H., 8.4% and S., 10.2%, which corresponds closely with the calculated composition of ethyleneglycol bis[2-[(3,5-di-tert-butyl-4-hydroxybenzyl)thio]acetate]. An NMR conformed the above identity of the product.

The corresponding benzyloxy-substituted ester is made by placing in the above reaction vessel 25.5 parts of 3,5-di-tert-butyl-4-hydroxybenzyl chloride, 390 parts of benzene and 9 parts of glycol di(α-hydroxy acetate). Add 20 parts of triethylamine and, while stirring, heat the mixture to reflux. After an hour, cool the mixture to room temperature and filter off the precipitate. Water wash the filtrate and then evaporate off the benzene, leaving ethyleneglycol bis[2-[(3,5-di-tert-butyl - 4 - hydroxybenzyl)oxy]acetate], which may be purified by recrystallization from ethanol.

EXAMPLE 2

In the reaction vessel of Example 1 was placed 25.4 parts of 3,5-di-tert-butyl-4-hydroxybenzyl chloride, 350 parts of ether and 10.8 parts of pentaerythritol tetrathioglycolate. The glycolate did not dissolve. The mixture was stirred vigorously as 20.2 parts of triethylamine was added over a 10 minute period. A precipitate formed. After standing overnight, the mixture was filtered and the filtrate was water washed until neutral. Ether was evaporated from the filtrate leaving a viscous orange residue. The residue was recrystallized from petroleum ether and then from an isopropanol/dioxane mixture. The product melted at 169–171° C. and analyzed: C., 66.6%; H., 8.5% and S., 9.6%. This corresponds closely to the calculated value for pentaerythritol tetrakis[2-[(3,5-di-tert-butyl-4-hydroxybenzyl)thio]acetate].

In the above examples other mercapto esters can be used to yield the expected compound. Examples of suitable mercapto esters are:

lauryl-α-mercapto acetate
cetyl-3-mercapto propionate
glycol-di-β-mercapto propionate
pentaerythritol tetrakis(3-mercapto propionate)
ethylenetrimethylene tris(3-mercapto propionate)
ethylenetrimethylene tris(2-mercapto acetate)
propylidenetrimethylene tris(3-mercapto propionate)
propylidenetrimethylene tris(2-mercapto acetate)

Likewise, the composition of the final product may be changed by using different phenolic benzyl halides such as:

3-cyclohexyl-4-hydroxy-6-methyl-α-methylbenzyl bromide
3-methyl-4-hydroxy-5-tert-butyl-benzyl chloride
3,5-di(α-methylbenzyl)-4-hydroxybenzyl chloride
3-tert-octyl-4-hydroxy-6-ethyl-α,α-dimethylbenzyl bromide
3,5-diisopropyl-4-hydroxybenzyl chloride
3,5-di-sec-butyl-4-hydroxybenzyl chloride The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene and iron carbonyl have appreciably increased stability when treated with the additives of this invention. Furthermore, lubricating oils and functional fluids, both those derived from naturally-occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizng a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, styrene-butadiene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The antioxidants of this invention are particularly useful in homopolymers and copolymers of ethylenically unsaturated monomers. By ethylenically unsaturated monomers is meant a monomer which contains one or more carbon double bonds which impart to it the property of polymerization. Examples of such ethylenically unsaturated monomers are ethylene, propylene, butene-1, 1,3-butadiene, isoprene, chloroprene, vinyl chloride, vinylidene chloride, methylacrylate, methylmethacrylate, styrene, divinyl benzene, acrylonitrile, dicyclopentadiene, 1,4-pentadiene, and the like.

The ethylenically unsaturated monomers may be used to form homopolymers or copolymers. Typical homopolymers are polyethylene, polypropylene, polybutene, polyvinyl chloride, polybutadiene, poly-cis-butadiene, polyisoprene, polychloroprene, polymethacrylates, polystyrene, polyacrylonitrile, and the like. Copolymers include polymers made using two or more different monomers. Some examples of these are styrene-butadiene rubber, ethylenepropylene rubber, and the like. Higher copolymers include such materials as acrylonitrile butadiene styrene terpolymer, ethylenepropylene dicyclopentadiene terpolymer, ethylenepropylene 1,4-pentadiene terpolymer, and the like.

The amount of stabilizer used in the organic compositions of this invention is not critical, as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 3

A rubber stock is prepared containing the following components:

| Component: | Parts |
| --- | --- |
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of lauryl 3 - [(3 - tert - butyl-4-hydroxy-6-methylbenzyl)thio]propionate and, following this, individual samples are cured for 20, 30, 45 and 60 minutes, respectively, at 274° C. After cure, all of these samples remain white in color and possess excellent tensile strength. Furthermore, they are resistant to degradation caused by either oxygen or ozone on aging.

EXAMPLE 4

A synthetic rubber master batch comprising 100 parts of SBR rubber having an average molecular weight of 60,000, 50 parts of mixed zinc propionate-stearate, 50 parts of carbon black, 5 parts of road tar, 2 parts of sulfur and 1.5 parts of ethyleneglycol bis[2-[(3,5-di-sec-butyl-4-hydroxybenzyl)oxy]acetate]. This composition is then cured for 60 minutes employing 45 p.s.i.g. of steam pressure. The resulting synthetic rubber possesses resistance to oxygen and ozone induced degradation.

EXAMPLE 5

A butadiene acrylonitrile copolymer is prepared from 68 percent 1,3-butadiene and 32 percent acrylonitrile. Two percent, based on the weight of the copolymer, of ethyl 2 - [(3 - cyclohexyl-4-hydroxy-5-ethylbenzyl)thio] hexoate is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 6

Three percent of pentaerythritol tetrakis[2-[(3,5-di-tert-butyl-4-hydroxybenzyl)thio]acetate] is added to a rubber-like terpolymer of 45 percent ethylene, 52 percent propylene and 3 percent dicyclopentadiene. The resulting synthetic elastomer possesses enhanced stability.

EXAMPLE 7

To a master batch of GR-N synthetic rubber containing 100 parts of GR-N rubber, 5 parts of zinc stearate, 50 parts of carbon black, 5 parts of road tar, 2 parts of sulfur and 2 parts of mercaptobenzothiazole is added 5 percent, based on weight, of ethylidene trimethylene tris-[3 - [(3,5 - di-isopropyl-4-hydroxybenzyl)thio]butyrate]. After curing, a synthetic rubber is obtained of improved oxidative stability.

EXAMPLE 8

To a master batch of polyethylene having an average molecular weight of 1,000,000, a tensile strength of 6,700 p.s.i., a Shore D hardness of 74 and a softening temperature under low load of 150° C. is added 5 percent of cetyl[2 - (3,5-di-tert-butyl-4-hydroxybenzyl)thio]acetate. The resulting polyethylene possesses stability against oxidative degradation and shows no tendency to yellow after extensive aging.

EXAMPLE 9

A linear polyethylene having a high degree of crystallinity (93 percent), and less than one branched chain per 100 carbon atoms, a density of about 0.96 gram per ml. and which has about 1.5 double bonds per 100 carbon atoms, is mixed with 0.005 weight percent of ethyleneglycol bis[2 - [(3,5 - di-tert-butyl-4-hydroxybenzyl)thio] acetate]. The resulting polyethylene is found to possess stability against oxidative degradation.

EXAMPLE 10

To 100 parts of an ethylene propylene 1,4-pentadiene terpolymer is added 3 parts of eicosyl 3-[(3-tert-octadecyl - 4 - hydroxy-6-methylbenzyl)thio]propionate, resulting in an ethylene propylene terpolymer of enhanced stability.

EXAMPLE 11

To 100 parts of an ethylene propylene rubber is added 2 parts of pentaerythritol tetrakis[2 - [(3 - sec-butyl-4-hydroxy - 5 - methylbenzyl)thio]acetate], resulting in an EPR rubber stock of improved stability.

EXAMPLE 12

After the polymerization of polypropylene in a hexane solvent employing a Ziegler catalyst, the catalyst is neutralized with water and ethyleneglycol bis[3-[(3,5-di-tert-butyl-4-hydroxybenzyl)thio]propionate] is added to the mixture in quantities such that, after removal of the solvent, a Ziegler polypropylene is obtained containing 2 percent of ethyleneglycol bis[3 - [(3,5-di-tert-butyl-4-hydroxybenzyl)thio]propionate]. This polypropylene is found to possess excellent stability against the degradation caused by oxygen or ozone. Furthermore, this polypropylene is found to resist degradation at elevated temperatures, even in the presence of oxygen. During this high temperature aging the Ziegler polypropylene shows no tendency to discolor.

EXAMPLE 13

To 1,000 parts of a gasoline containing 26.6 percent aromatics, 20.8 percent olefins, 52.6 percent saturates and having an API gravity of 62.1 is added 10 parts of butyl-[(3-sec-amyl-4-hydroxy - 5 - methylbenzyl)thio]acetate. The resulting gasoline is stable.

EXAMPLE 14

To 10,000 parts of gasoline containing 8.6 percent aromatics, 7.9 percent olefins, 83.5 percent saturates and having an API gravity of 68.5 is added 200 parts of trimethylolethane tris[2-[(3-methyl - 5 - cyclohexyl-4-hydroxybenzyl)thio]acetate]. The resulting gasoline is stable against oxidative degradation.

EXAMPLE 15

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of ethyl-2-[(3-isopropyl-5-tert-butyl-4-hydroxybenzyl)thio]acetate. The resulting gasoline containing a manganese antiknock was resistant to oxidative degradation.

EXAMPLE 16

To 1,000 parts of a toluene solution of polybutadiene containing 95 percent cis-isomer is added 0.5 weight percent, based on the polybutadiene, of ethyleneglycol bis-[2-[(3,5-di-tert-butyl - 4 - hydroxybenzyl)thio]butyrate]. The solution is conducted into boiling water causing the toluene to steam distill. The precipitate formed is a stabilized poly-cis-butadiene crumb.

EXAMPLE 17

To 1,000 parts of polychloroprene is added 7 parts of pentaerythritol tetrakis[3-[(3,5-di-sec-butyl - 4 - hydroxybenzyl)thio]heptoate].

EXAMPLE 18

An antiknock fluid composition is prepared by mixing together 61.5 parts of tetraethyllead, 17.9 parts of ethylenedibromide, 18.8 parts of ethylenedichloride and 1.3 parts of propylidene trimethylene tris[3-[(3,5-di-sec-cetyl-4-hydroxybenzyl)oxy]propionate], resulting in a stable antiknock fluid composition.

EXAMPLE 19

To 1,000 parts of a commercial diesel fuel having a cetane number of 42, is added 5 parts of amyl nitrate and 4 parts of ethylidene trimethylene tris[2-[(3,5-di-isopropyl-4-hydroxybenzyl)oxy]acetate], resulting in a diesel fuel of high resistance to oxidative deterioration which does not form gum or sludge on storage.

EXAMPLE 20

To 1,000 parts of a solvent-refined neutral oil (95 viscosity index and 200 SUS at 100° F.) containing 6 percent of a commercial methacrylate type VI improver is added 5 percent of ethyleneglycol bis[3-[(3,5-di-tert-amyl - 4 - hydroxybenzyl)thio]propionate], resulting in a stable lubricating oil.

EXAMPLE 21

To a solvent-refined crankcase lubricating oil having a viscosity index of 95 and a SAE viscosity of 10 is added 0.1 percent of pentaerythritol tetrakis[2-[(3,5 - di-cyclohexyl-4-hydroxybenzyl)oxy]propionate]. The resulting oil was stable against oxidative degradation.

EXAMPLE 22

To 100,000 parts of a petroleum hydrocarbon oil having a gravity of 30.3° API at 60° F., viscosity of 178.8 SUS at 100° F., a viscosity index of 154.2, and containing 1,000 parts of the reaction product of an alkenyl succinic anhydride where the alkenyl group has a molecular weight of 1,000, with a polyethylene amine, is added 200 parts of propylidene trimethylene tris[2-[(3-tert-amyl-6-methyl - 4 - hydroxybenzyl)thio]hexoate]. The resulting lubricating oil possesses excellent dispersancy and is resistant to oxidative degradation.

EXAMPLE 23

To 100,000 parts of a commercially available pentaerythritol ester having a viscosity at 100° F. of 22.4 centistokes and known under the trade name of "Hercoflex 600" is added 400 parts of pentaerythritol tetrakis-[2-[(3,5-di-tert-butyl-4-hydroxybenzyl)oxy]acetate]. The resulting synthetic lubricating oil possesses improved resistance against oxidative deterioration.

EXAMPLE 24

To 100,000 parts of dioctyl sebacate having a viscosity at 210° F. of 36.7 SUS, a viscosity index of 159, and a molecular weight of 427, is added 250 parts of ethyleneglycol bis[3-[(3,5-di-tert-nonyl - 4 - hydroxybenzyl)thio]propionate], resulting in a synthetic diester lubricating oil having improved resistance to oxidative degradation.

EXAMPLE 25

To 1,000 parts of a commercial coconut oil is added 5 parts of lauryl 3-[(3-tert-butyl-4-hydroxy - 6 - methylbenzyl)thio]propionate, resulting in a vegetable oil with good aging characteristics.

EXAMPLE 26

To 100,000 parts of lard is added 100 parts of ethyleneglycol bis[6 - [(3,5-di-cyclohexyl-4-hydroxybenzyl)thio]hexoate], resulting in a lard having resistance to rancidity.

The stabilizing additives of this invention are eminently useful as stabilizers in poly-α-olefins such as polyethylene, polypropylene, and the like. In this use they function an antioxidants, antiozonants and also as thermal stabilizers. They are extremely long lasting and highly resistant to the formation of color.

In order to demonstrate their vastly superior stabilization effect, tests were conducted using a commercial polypropylene. These tests are known as "Oven Aging Tests" and are recognized in the plastic industry as an accurate guide to oxidative stability. In these tests small specimens of polypropylene are prepared containing the test stabilizer. These test specimens are placed in an air circulating oven maintained at 150° C. Five replicates are made of each polypropylene stabilizer composition and the test criteria is the time and hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring Blender. The mixture is then molded into a 6" x 6" sheet with a thickness of 0.025". This is accomplished in a molding press at 400° F. under 5,000 p.s.i. pressure. Each sheet is then cut into ½" x 1" test specimens in order to obtain the five replicate samples. These samples are then subjected to the Oven Aging Tests.

In order to compare the stabilizing additives of this invention, tests were carried out employing several commercially accepted stabilizers along with the preferred stabilizer of the present invention. The results obtained are shown in the following table.

| Additive | Conc. (wt. percent) | Hours to failure |
|---|---|---|
| 1... None | | 2.5 |
| 2... 2,6-di-tert-butyl-4-methylphenol | 0.3 | 16 |
| 3... 2,2'-methylenebis(4-methyl-6-tert-butylphenol) | 0.3 | 112 |
| 4... 4,4'-thiobis(2-tert-butyl-5-methylphenol) | 0.3 | 96 |
| 5... Ethyleneglycol bis[2-[(3,5-di-tert-butyl-4-hydroxybenzyl)-thio]acetate] | 0.3 | 688 |
| 6... Pentaerythritol tetrakis[2-[(3,5-di-tert-butyl-4-hydroxybenzyl)thio]acetate] | 0.3 | 832 |

As the above table shows, the additive of the present invention increased the oven life of the polypropylene almost 300 times that obtained without any additive, and about 6 to 8 times as much as the life obtained with two commercially accepted antioxidants. Thus, it can be seen that the additives of the present invention are superior to stabilizers available in the prior art.

The effectiveness of the present stabilizers can be enhanced still further by employing synergistic mixtures of the stabilizers of this invention. The preferred synergists are those having the formula:

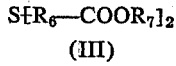
(III)

wherein $R_6$ is a divalent hydrocarbon radical containing from 1 to about 6 carbon atoms, and $R_7$ is an alkyl radical containing from 6 to 20 carbon atoms. In the preferred synergist $R_6$ is a divalent radical containing 2 to 4 carbon atoms, and $R_7$ is an alkyl radical containing from 10 to 18 carbon atoms. The most preferred synergists are dilaurylthiodipropionate and distearylthiodipropionate.

Another useful synergist is a phosphorus compound having the formula:

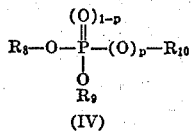
(IV)

wherein $R_8$ and $R_9$ are selected from the group consisting of alkyl radicals containing from 1–12 carbon atoms, aryl radicals containing from 6–20 carbon atoms, aralkyl radicals containing from 7–20 carbon atoms, $R_{10}$ is selected from the group consisting of hydrogen and $R_8$, and $p$ is an integer from 0–1. Examples of these synergists are tri-nonylphenyl phosphite, di-n-butyl hydrogen phosphonate, dibenzyl hydrogen phosphonate, triphenyl phosphite, tri-m-cresyl phosphite, di-sec-amyl hydrogen phosphonate, di-sec-butyl hydrogen phosphonate, and the like.

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. Best results are usually obtained with stabilizing mixtures containing from 50 to 66 percent synergist and from 34 to 50 percent stabilizing compound.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed. This effect is shown in the following data obtained using the previously described Oven Aging Test.

| Sample No. | | Conc. (wt. percent) | Hours to failure |
|---|---|---|---|
| 1 | None | | 2.5 |
| 2 | DLTDP | 0.3 | 288 |
| 3 | Ethyleneglycol bis[2-(3,5-di-tert-butyl-4-hydroxybenzyl)thio]acetate] plus DLTDP. | 0.1 0.2 | 592 |
| 4 | Pentaerythritol tetrakis[2-(3,5-di-tert-butyl-4-hydroxybenzyl)thio[acetate] plus DLTDP. | 0.1 0.2 | 856 |

Despite the fact that Samples 3 and 4 containing the synergistic mixture contained only one-third as much antioxidant of this invention as did Samples 5 and 6 in the previous test, it can be seen that it exhibits an unexpectedly long oven aging life. This can only be attributed to a synergistic interaction between DLTDP and the stabilizer, because DLTDP alone, even at 0.3 weight percent (Sample 2), only gave an oven life of 288 hours.

Following are some examples of the synergistic stabilizing compositions of the present invention.

|  | Percent |
|---|---|
| Lauryl 3 - [(3-tert-butyl-4-hydroxy-6-methylbenzyl)oxy]propionate | 33 |
| Dilaurylthiodipropionate | 67 |
| Eicosyl 2 - [(3,5 - di-sec-butyl-4-hydroxybenzyl)thio]heptoate | 50 |
| Dihexylthiodiacetate | 50 |
| Ethyleneglycol bis [3 - [3,5-di(α-methylbenzyl)-4-hydroxybenzyl]oxy]propionate] | 1 |
| Diheptylthiodivalerate | 99 |
| Propylidenetrimethylene tris[3 - [(3 - tert-octyl-4-hydroxy - 5 - (α,α - dimethylbenzyl)benzyl)thio]heptoate] | 99 |
| Di-n-octyl-thiodipropionate | 1 |
| Isopropylidenedimethylene bis[3 - [(3 - sec-octadecyl-4 - hydroxy - 6 - methyl - α - methylbenzyl)oxy]propionate] | 75 |
| Didecylthiodiacetate | 25 |
| Amyl 2 - [(3,5 - di - tert-amyl-4-hydroxybenzyl)thio]acetate | 25 |
| Diundecylthiodibutyrate | 75 |
| Lauryl [2 - (3,5 - di - tert-octyl-4-hydroxybenzyl)thio]acetate | 25 |
| Dioctadecylthiodipropionate | 75 |
| Eicosyl [2 - (3,5 - di - tert - octadecyl - 4 - hydroxybenzyl)thio]acetate | 80 |
| Dinonadecylthiodibutyrate | 20 |
| Ethyleneglycol bis [2-[(3,5-di - tert - butyl-4-hydroxybenzyl)thio]acetate] | 60 |
| Dieicosylthiodipropionate | 40 |
| Propylidenetrimethylene tris[2 - [(3,5 - di - tert-butyl-4-hydroxybenzyl)thio]acetate] | 10 |
| Dilaurylthiodipropionate | 90 |
| Ethylidenetrimethylene tris[2 - [(3,5 - di - tert-butyl-4 - hydroxybenzyl)thio]acetate] | 90 |
| Dilaurylthiodipropionate | 10 |
| Pentaerythritol tetrakis[2 - [(3,5 - di-tert-butyl-4-hydroxybenzyl)thio]acetate] | 30 |
| Distearylthiodipropionate | 70 |
| Lauryl 3 - [(3,5 - di - sec - butyl - 4 - hydroxybenzyl)thio]propionate | 1 |
| Di-sec-butyl hydrogen phosphonate | 99 |
| Ethyleneglycol bis[2 - [(3,5 - di - tert-butyl-4-hydroxybenzyl)thio]acetate] | 99 |
| Tri-p-nonylphenyl phosphite | 1 |
| Pentaerythritol tetrakis[2 - [3,5 - di - cyclohexyl - 4-hydroxybenzyl)thio]acetate] | 50 |
| Tri-n-butyl phosphite | 50 |

The above synergistic stabilizer compositions are beneficially employed in any of the previously described organic materials normally susceptible to deterioration due to the effect of oxygen or ozone. In Examples 3 through 26 each of the above synergistic compositions can be substituted for the stabilizing compound of the present invention now shown, resulting in an organic composition of increased resistance to degradation from the effects of oxygen or ozone.

Having fully described new compositions of matter eminently useful in stabilizing organic materials and having further described synergistic combinations of these stabilizers with sulfur compounds and further shown use of these combinations in stabilizing organic material, it is intended that this invention should be limited only within the spirit and scope of the following claims.

I claim:
1. Organic material normally susceptible to oxidative degradation selected from the group consisting of homopolymers and copolymers of ethylenically unsaturated monomers containing an antioxidant amount of an antioxidant compound having the formula:

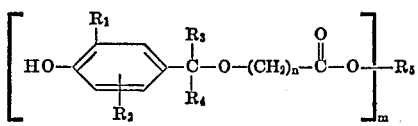

wherein $R_1$ is selected from the group consisting of alpha-branched alkyl radicals containing from 3–20 carbon atoms, alpha-branched aralkyl radicals containing from 8–20 carbon atoms and cycloalkyl radicals containing from 6–20 carbon atoms, $R_2$ is selected from the group consisting of alkyl radicals containing from 1–20 carbon atoms, aralkyl radicals containing from 7–20 carbon atoms and cycloalkyl radicals containing from 6–20 carbon atoms, $R_3$ and $R_4$ are independently selected from the group consisting of hydrogen and lower alkyl radicals containing from 1 to about 4 carbon atoms, $n$ is an integer from 1–6, $R_5$ is a hydrocarbon radical containing from 1 to about 20 carbon atoms and having valence $m$, and $m$ is an integer from 1–4.

2. A composition of claim 1 wherein $m$ is 2 and $R_5$ is the divalent hydrocarbon radical $—CH_2—CH_2—$.

3. A composition of claim 2 wherein said organic material is polypropylene.

4. A composition of claim 1 wherein said antioxidant compound is ethyleneglycol bis-[2-[(3,5-di-tert-butyl-4-hydroxybenzyl)oxy]acetate].

5. A composition of claim 1 wherein said antioxidant compound is pentaerythritol tetrakis-[2-[(3,5-di-tert-butyl-4-hydroxybenzyl)oxy]acetate].

6. The composition of claim 1 wherein said organic material is polypropylene.

7. The composition of claim 1 containing a synergistic amount of a synergist selected from the group of compounds having the formula:

(A) 

wherein $R_6$ is a divalent hydrocarbon radical containing from 1 to about 6 carbon atoms, and $R_7$ is an alkyl radical containing from about 6 to 20 carbon atoms, and (B) 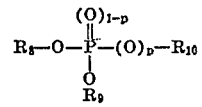

wherein $R_8$ and $R_9$ are selected from the group consisting of alkyl radicals containing from 1–12 carbon atoms, aryl radicals containing from 6–20 carbon atoms, aralkyl radicals containing from 7–20 carbon atoms, $R_{10}$ is selected from the group consisting of hydrogen and $R_8$, and $p$ is an integer from 0–1.

References Cited
UNITED STATES PATENTS

| | | | |
|---|---|---|---|
| 3,285,855 | 11/1966 | Dexter et al. | 260—45.85 |
| 3,459,704 | 8/1969 | Peterson et al. | 260—45.85 |
| 3,546,272 | 12/1970 | Braus et al. | 260—45.85 |

OTHER REFERENCES

Atmospheric Oxidation and Antioxidants, by Scott, 1965, Elsevier Pub. Co., N.Y.C., pp. 295 to 299.

DONALD E. CZAJA, Primary Examiner

V. P. HOKE, Assistant Examiner

U.S. Cl. X.R.

44—70; 99—163; 252—56 R; 260—45.7 P, 398.5, 666.5, 810, 814, 45.85 S